United States Patent
Takeda et al.

(10) Patent No.: US 7,562,886 B2
(45) Date of Patent: Jul. 21, 2009

(54) INSTALLATION STRUCTURE AND METHOD OF VEHICULAR SUSPENSION

(75) Inventors: Riki Takeda, Atsugi (JP); Takashi Nishi, Atsugi (JP); Toshio Furuta, Machida (JP); Tadashi Kanemoto, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/078,435

(22) Filed: Mar. 31, 2008

(65) Prior Publication Data

US 2008/0246242 A1    Oct. 9, 2008

(30) Foreign Application Priority Data

Apr. 3, 2007   (JP)   ............................. 2007-097229
Dec. 17, 2007  (JP)   ............................. 2007-324186

(51) Int. Cl.
*B60G 7/02*   (2006.01)
(52) U.S. Cl. ................ 280/124.109; 180/232; 296/187.038; 296/187.09
(58) Field of Classification Search ................ 280/781, 280/784, 124.109; 180/58, 232; 296/187.03, 296/187.08, 187.09
See application file for complete search history.

(56) References Cited

U.S. PATENT DOCUMENTS

| | | | | |
|---|---|---|---|---|
| 5,042,837 A | * | 8/1991 | Kleinschmit et al. | 280/784 |
| 6,131,685 A | * | 10/2000 | Sakamoto et al. | 180/232 |
| 6,722,696 B2 | * | 4/2004 | Sonomura et al. | 280/784 |
| 6,761,242 B2 | * | 7/2004 | Yoshida et al. | 180/298 |
| 7,040,446 B2 | * | 5/2006 | Anzai et al. | 180/312 |
| 7,144,039 B2 | * | 12/2006 | Kawasaki et al. | 280/784 |
| 7,393,016 B2 | * | 7/2008 | Mitsui et al. | 280/784 |
| 2005/0012317 A1 | * | 1/2005 | Taya et al. | 280/784 |
| 2005/0200093 A1 | * | 9/2005 | Komiya | 280/124.109 |

FOREIGN PATENT DOCUMENTS

JP    2002-002528    1/2002

* cited by examiner

*Primary Examiner*—Toan C To
(74) *Attorney, Agent, or Firm*—Foley & Lardner LLP

(57) ABSTRACT

In installation structure and method of a vehicular suspension, each of left and right suspension links couples a corresponding one of the left and right side members with the suspension member and is provided with a breakable portion which breaks due to a load generated when the load applied to a forward end portion of at least one of left and right front side members causes a drive unit and a drive shaft to be moved toward a rearward direction of a vehicle body to bring the drive shaft in contact against a corresponding one of the left and right suspension links.

12 Claims, 7 Drawing Sheets

VIEWED FROM AS IN FIG.3A

INSTALLATION STRUCTURE AND METHOD OF VEHICULAR SUSPENSION

BACKGROUND OF THE INVENTION (1) Field of the Invention

The present invention relates to installation structure and method of a vehicular suspension located at a forward portion of an automotive vehicle.

(2) Description of Related Art

A Japanese Patent Application Publication No. 2002-2528 published on Jan. 9, 2002 exemplifies a previously proposed installation structure of a vehicular suspension located at a forward (or front) portion of an automotive vehicle. In the disclosed previously proposed installation structure of the vehicular suspension located at the forward portion of the vehicle, front side members are disposed at left and right side portions of a vehicle body along a vehicular forward-and-rearward (longitudinal) direction. A forward (front) end portion of each of the front side members is linked to a front bumper reinforcement. A rearward (rear) end portion of each of the front side members is bent toward a lower side of the vehicle body and is linked to left and right side sills. In addition, a suspension member is disposed on a lower side of the (left and right) front side members to be intersected to the left and right front side members, left and right forward end portions of the suspension member are linked to the respective front side members via suspension links, and a rearward end portion of the suspension member is linked to the respective front side members. An engine and a transmission, both thereof constituting a drive unit, are disposed in an engine compartment enclosed with the left and right front side members, the front bumper reinforcement, and the suspension member and left and right front road wheels are connected to a drive shaft extended along a left-and-right (lateral or vehicular width) direction of the vehicle body. It should be noted that the suspension links are tightened with bolts to the respective front side members and notches are provided on bolt penetrating holes at tightening portions of the respective suspension links. In a case where a (an excessively high) load is applied from the forward portion of the vehicle body, engine compartment forward-and-rearward portions of the respective front side members are buckled. At this time, the drive unit is moved (retracted) toward a rearward portion of the vehicle body and the drive shaft is interfered with the respective suspension links. Then, the tightening of the suspension links to the front side members is released due to presence of the notches of the tightening (coupling) portions of the suspension links. Consequently, no load is applied to the front side members via the suspension member even though the drive shaft is retracted toward the rearward portion of the vehicle body. Therefore, the front side members are not buckled at a more rearward position than the suspension member so that the load input from the forward portion of the vehicle body can be absorbed by a buckling of the left and right front side members at their engine compartment forward-and-rearward portions.

SUMMARY OF THE INVENTION

However, since the notches are provided on the tightening (coupling) portions of the respective suspension links in the previously proposed installation structure of the vehicular suspension located at the forward portion of the vehicle body disclosed in the above-described Japanese Patent Application Publication, there is a possibility of occurrence of deformation and rupture (or called, break) in the respective suspension links due to the load input during an assembly operation of the suspension and during an actual running of the vehicle.

It is, hence, an object of the present invention to provide installation structure and method of a vehicular suspension which have no deformation and rupture (or break) when the load input during the assembly operation of the suspension and during the actual running of the vehicle occurs and have suspension links, each suspension link having a breakable portion at which the break (or rupture) of the suspension links assuredly occurs without failure against the (excessively high) load input from the forward portion of the vehicle body.

According to one aspect of the present invention, there is provided an installation structure of a vehicular suspension, comprising: first and second side members, each of the first and second side members being disposed on a corresponding side portion of a vehicle body along a forward-and-rearward direction of the vehicle body; a drive unit mounted on a space between the first and second side members; a drive shaft extended from the drive unit in a width direction of the vehicle body and connected to drive wheels; a suspension member formed on the space between the first and second side members and disposed at a lower-and-rearward portion of the drive unit; and first and second suspension links, each of the first and second suspension links linking a corresponding one of the first and second side members with the suspension member and being provided with a breakable portion which breaks due to a load generated when the load applied to a forward end portion of at least one of the first and second side members causes the drive unit and the drive shaft to be moved toward a rearward direction of the vehicle body to bring the drive shaft in contact against a corresponding one of the first and second suspension links.

According to another aspect of the present invention, there is provided an installation method of a vehicular suspension, comprising: disposing each of first and second side members on a corresponding side portion of a vehicle body along a forward-and-rearward direction of the vehicle body; mounting a drive unit on a space between the first and second side members; extending a drive shaft from the drive unit in a width direction of the vehicle body and connecting the drive shaft to drive wheels; forming a suspension member on the space between the first and second side members and disposing the suspension member at a lower-and-rearward portion of the drive unit; and linking via each of first and second suspension links a corresponding one of the first and second side members with the suspension member and providing a breakable portion on a corresponding one of the first and second suspension links, the breakable portion breaking due to a load generated when the load applied to a forward end portion of at least one of the first and second side members causes the drive unit and the drive shaft to be moved toward a rearward direction of the vehicle body to bring the drive shaft in contact against a corresponding one of the first and second suspension links.

In the present invention, since the suspension links are assuredly broken at the respective breakable portions without failure against the (excessively high) load input from the forward portion of the vehicle body so that a deformation (quantity) of the vehicle body due to a retraction of the drive unit toward the rearward portion of the vehicle body becomes small and the deformation and break (deformation and rupture) at the breakable portion due to the load input during the assembly operation of the suspension and during the actual running of the vehicle. The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

First Embodiment

Figure 1:
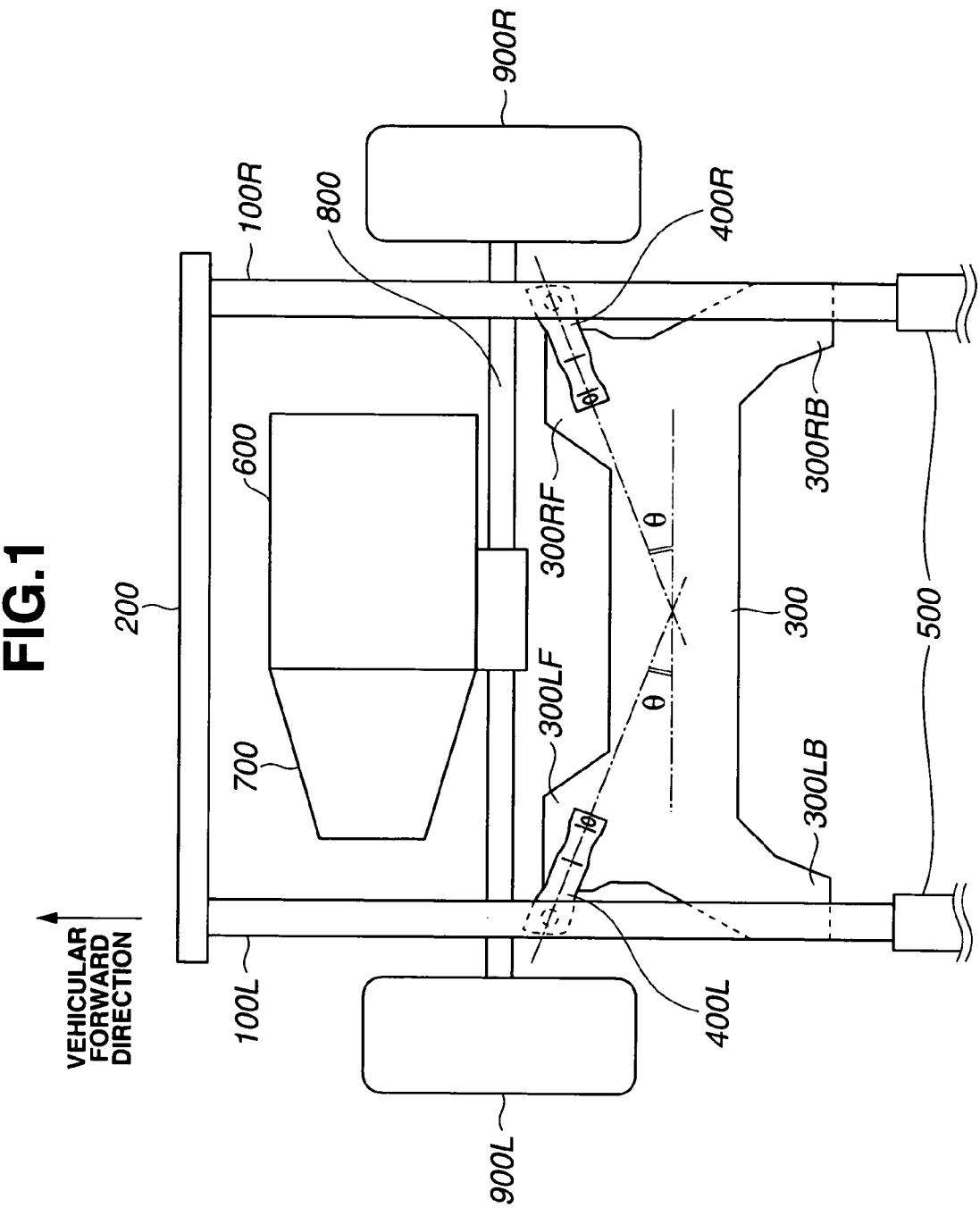
FIG. 1 is a plan view of an installation structure of a vehicular suspension in a first preferred embodiment according to the present invention.

FIG. 1 shows a first embodiment of an installation structure of a vehicular suspension according to the present invention. In FIG. 1, each of left and right front side members 100L, 100R is disposed on a corresponding one of left and right side portions of a vehicle body along a forward-and-rearward (longitudinal) direction of the vehicle body and respective forward end portions of left and right front side members 100L, 100R are linked to a front bumper reinforcement 200.

On the other hand, respective rearward end portions of left and right front side members 100L, 100R are bent toward a lower portion of the vehicle body so as to be linked to left and right side sills 500. A suspension member 300 is disposed on a lower portion of left and right front side members 100L, 100R so as to be intersected to left and right front side members 100L, 100R. Left and right forward end portions 300LF, 300RF of suspension member 300 are linked to left and right front side members 100L, 100R via left and right suspension links 400L, 400R, respectively. Rearward end portions 300LB, 300RB of suspension member 300 are linked to left and right front side members 100L, 100R, respectively. That is to say, suspension member 300 is formed on a space between left and right front side members 100L, 100R and is positioned on a lower-and-rearward position of a drive unit.

Figure 2:
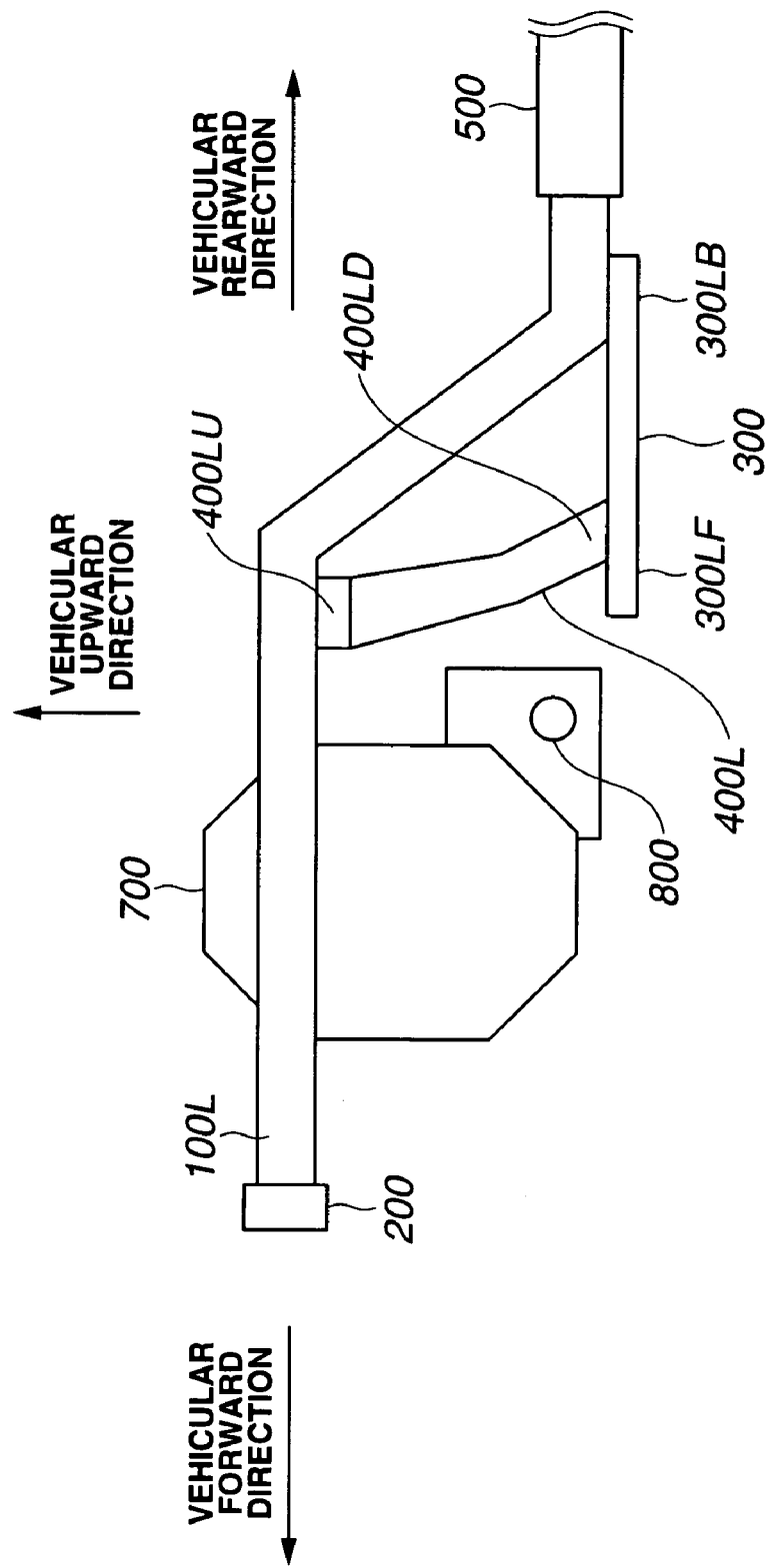
FIG. 2 is a left side view of the installation structure of the vehicular suspension shown in FIG. 1.
Figure 3A:
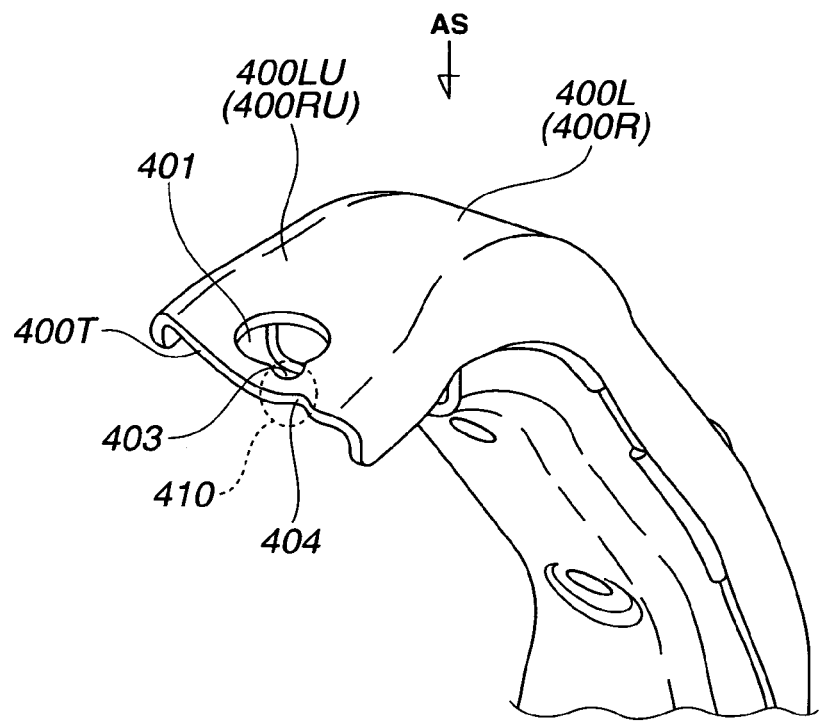
FIGS. 3A and 3B are explanatory views for explaining a breakable portion of a left suspension link shown in FIGS. 1 and 2.
Figure 3B:
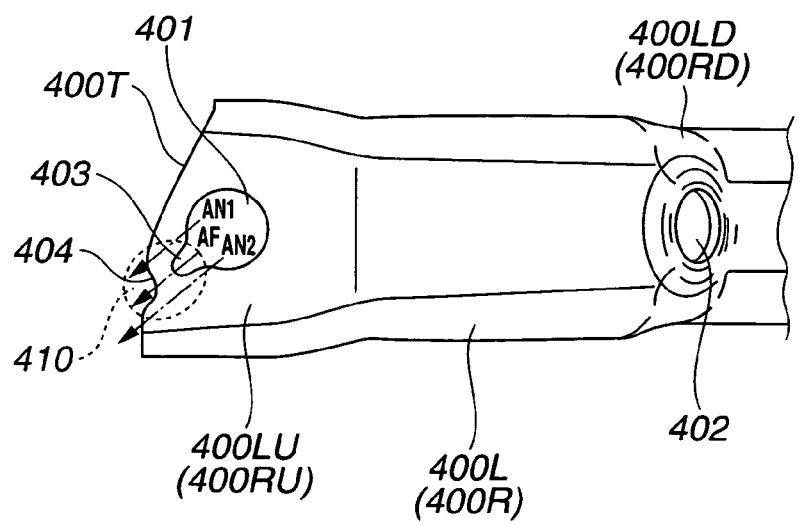

An engine 600 and a transmission 700, both constituting the drive unit, are disposed in an engine compartment enclosed with left and right front side members 100L, 100R, front bumper reinforcement 200, and suspension member 300. Left and right front road wheels 900L, 900R which are drive wheels are mounted on (connected to) a drive shaft 800 extended in a leftward-and-rightward (a width) direction of the vehicle body. FIGS. 3A and 3B show one of left and right suspension links 400L (400R). Each suspension link 400L (400R), as shown in FIG. 2, has its upper end portion 400LU (400RU) tightened via a-bolt penetrating hole 401 (refer to FIGS. 3A and 3B) onto a lower portion of each of front side members 100L (100R) with a bolt (not shown) and has its lower end portion 400LD (400RD) tightened via another bolt penetrating hole 402 (refer to FIG. 3B) onto an upper portion of forward end portion 300LF (300RF) of suspension member 300 with a bolt (not shown). A bolt penetrating hole recess portion 403 continuous to bolt penetrating hole 401 is provided on a tip portion 400T of suspension link 400L (400R) at bolt penetrating hole 401 of upper end portion 400LU (400RU) of suspension link 400L (400R). In addition, an end recess portion 404 is provided on tip portion 400T of suspension link 400L (400R) near to bolt penetrating hole 401. These bolt penetrating hole 403 and end recess portion 404 are set to be aligned in a load input direction (in an arrow-marked direction as viewed from AF in FIG. 3B) applied to suspension link 400L (400R) when the load is inputted from the forward portion of the vehicle body.

In this embodiment, these bolt penetrating hole recess portion 403, end recess portion 404, and a portion of suspension link 400L (400R) interposed between bolt penetrating hole recess portion 403 and end recess portion 404 constitute a breakable portion (also called, a rupturable portion) 410 which breaks (or ruptures) in a case where a (an excessively high) load input occurs. As described above with reference to FIGS. 3A and 3B, breakable portion 410 is positioned on upper end portion 400LU (400RU) of suspension link 400L (400R) and is provided on a tightening (coupling) portion between each of suspension links 400L (400R) and corresponding one of left and right front side members 100L (100R). According to the structure described above, a cross sectional area of breakable portion 410 in a direction at which the load input occurs (the arrow-marked direction of AF in FIG. 3B) is set to be smaller than that of each of adjacent portions (in arrow-marked directions of AN1 and AN2 in FIG. 3B) to breakable portion 410. It should be noted that the same structure of right suspension link 400R as left suspension link 400L can be taken.

Each suspension link 400L, 400R is arranged to have a configuration in order for an elongate direction of each of left and right suspension links 400L, 400R to be intersected to a virtual line (a horizontal or lateral line denoted by a dot-and-dash line in FIG. 1) extended in parallel to drive shaft 800 toward a corresponding one of left and right suspension links 400L, 400R through a predetermined angle (θ) (like an inverted Japanese character (katakana) of ハ) as viewed from a top portion of the vehicle body as shown in FIG. 1.

Figure 4:
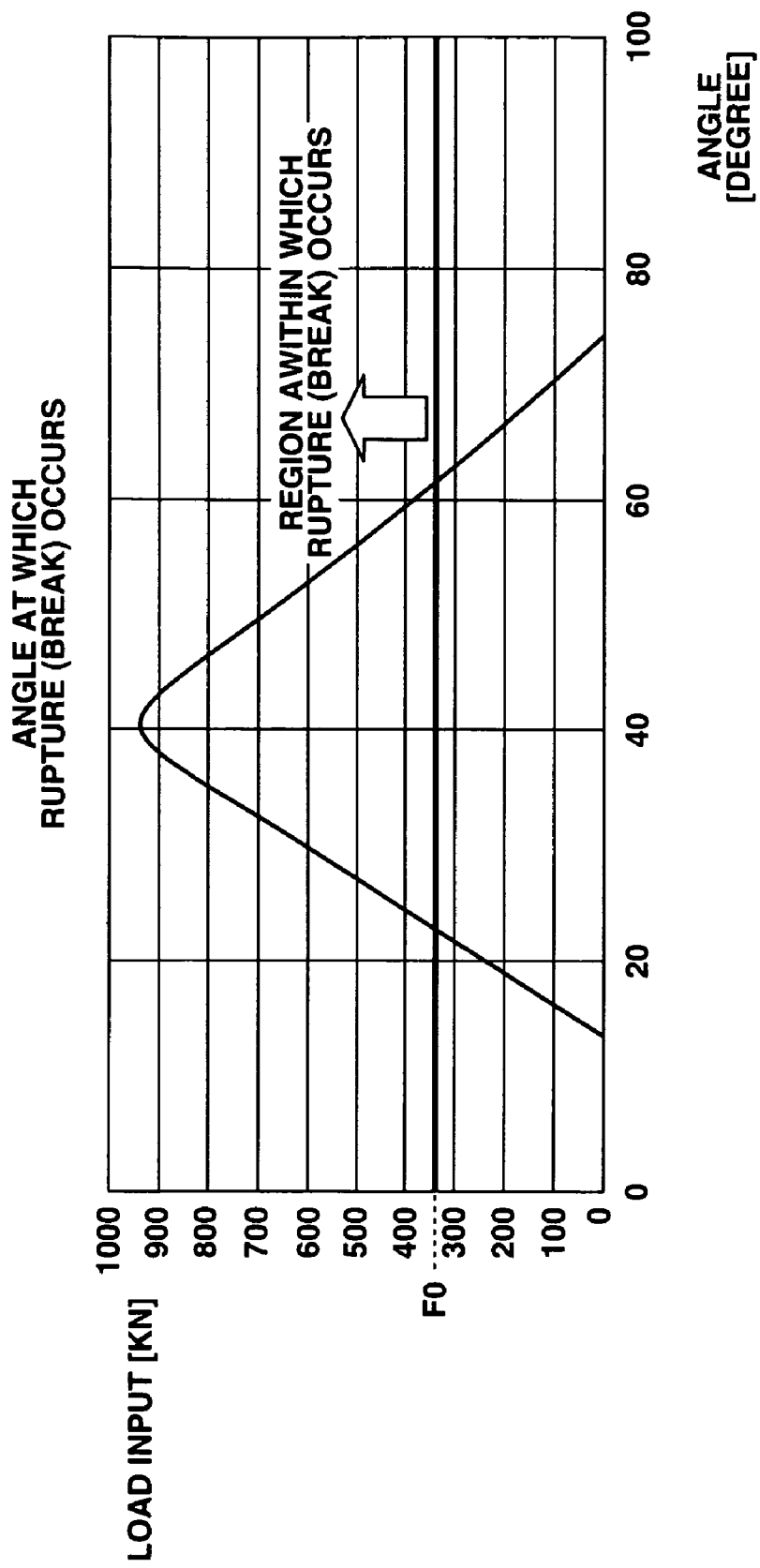
FIG. 4 is a graph representing a relationship between an installation angle (θ) of each of the suspension links and a magnitude of a load input in the first embodiment of the installation structure of the vehicular suspension according to the present invention.

FIG. 4 shows an analysis result of the relationship between predetermined angle θ of each suspension link 400L, 400R with respect to the horizontal line of the vehicle body and the load input applied to breakable portion 410. As appreciated from FIG. 4, a range of predetermined angle θ which can break (or rupture) breakable portion 410 is from 22 degrees to 62 degrees when the (excessively high) load input equal to or higher than a predetermined load input F0 by which breakable portion 410 is positively broken (ruptured) is applied from the forward portion of the vehicle body to breakable portion 410. Hence, each suspension link 400L, 400R is installed in order for predetermined angle θ to be set in this angular range. Consequently, the load input which can assuredly break breakable portion 410 of each of suspension links 400L, 400R can be applied to breakable portion 410.

Left and right suspension links 400L, 400R are disposed in the way as described above and, in a case where the load input equal to or higher than the predetermined load input is applied from the forward portion of the vehicle body, the load applied to a linkage position between suspension link 400L (400R) and front side member 100L (100R) provides a tensile load since a contacting position between each of suspension links 400L, 400R and drive shaft 800 is positioned at a more rearward side than the linkage position described above so that breakable portion 410 can more assuredly break breakable portion 410.

In addition, since breakable portion 410 is placed above drive shaft 800 so that a moment applied to breakable portion 410 from a portion subjected to the load becomes large for breakable portion 410 to become easy to be broken (ruptured). Furthermore, breakable portion 410 is provided on a coupling (tightening) portion between suspension link 400L (400R) and front suspension member 100L (100R), viz., the (upper) end portion of suspension link 400L (400R). Therefore, a machining of breakable portion 410 becomes easy (breakable portion for the other (right) suspension link 400R is the same).

Figure 5A:
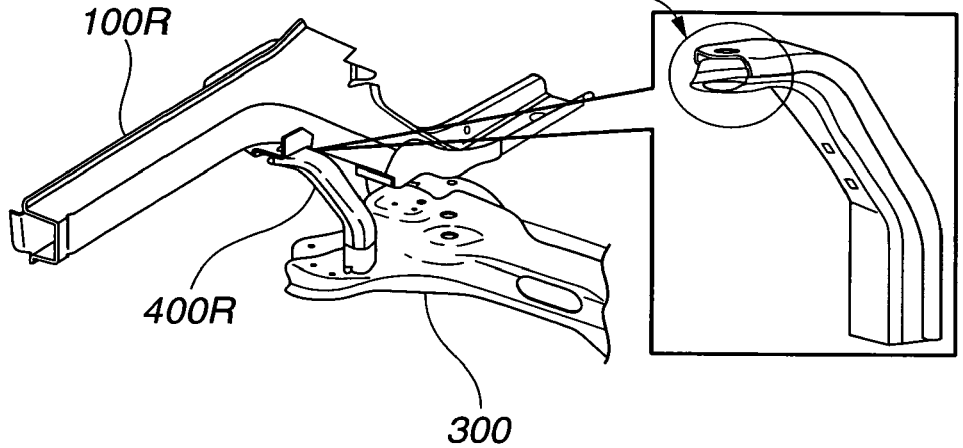
FIGS. 5A and 5B are analysis results of the load input applied to the suspension shown in FIGS. 1 and 2 in cases where the breakable portions are provided on left and right suspension links in the case of the first embodiment shown in FIGS. 1 and 2 or not provided on left and right suspension links.
Figure 5B:
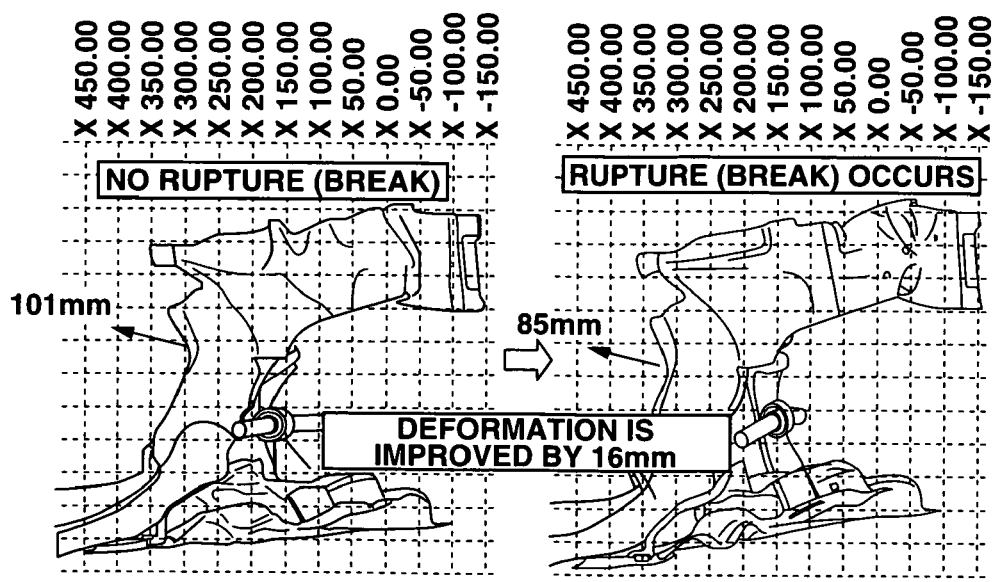

FIGS. 5A and 5B show analytical results of deformed states of front side member 100R and suspension member 300 when the load input described above is applied from the forward portion of the vehicle body in cases where breakable portion 410 is provided on suspension link 400R and no breakable portion is provided thereon. As shown in FIGS. 5A and 5B, when the same load input is applied from the forward portion of the vehicle body, a retraction (retraction distance) of front side member 100R indicated 101 millimeters in a case where no breakable portion is provided on suspension link 400R and indicated 85 millimeters in a case where breakable portion 410 is provided on suspension link 400R. Consequently, a deformation (quantity) of front side member 100R was improved by 16 millimeters. On the other hand, since breakable portion 410 has not taken a notch structure, deformation and rupture (break) of breakable portion 410 do not occur due to the load input during the assembly operation of the suspension and during the actual run of the vehicle.

Second Embodiment

Figure 6A:
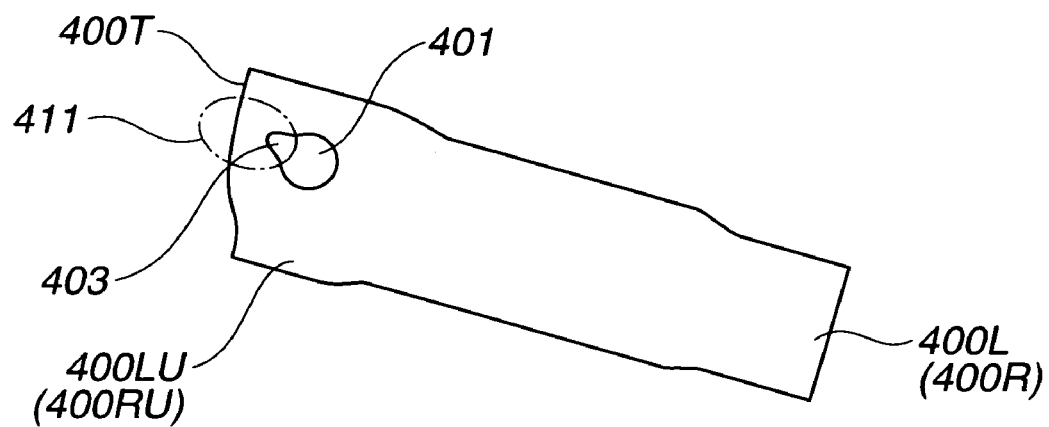
FIGS. 6A and 6B are same plan views of the left suspension link in the case of a second preferred embodiment according to the present invention.
Figure 6B:
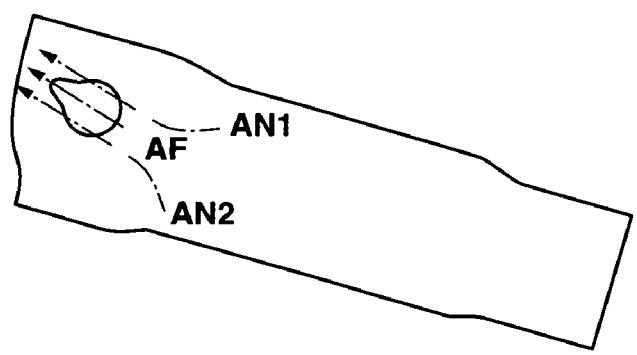

FIGS. 6A and 6B show same plan views of one suspension link 400L (400R) in a second preferred embodiment of the installation structure of the suspension according to the present invention.

In this embodiment, since only a form of breakable portion 411 is different from breakable portion 410 of the first embodiment, the structures of the other elements of the vehicular suspension are the same as those described in the first embodiment, the detailed description thereof will herein be omitted and only the form of breakable portion 411 will be described below. Bolt penetrating hole recess portion 403 which is continued to bolt penetrating hole recess portion 401 is provided at tip portion 400T of suspension link 400L (400R) in bolt penetrating hole 401 of upper end portion 400LU of suspension link 400L. This bolt penetrating hole recess portion 403 is set to be aligned to the load input direction (arrow-marked direction of AF in FIG. 6B) when the load input is applied from the forward portion of the vehicle body. A portion of tip portion 400T of suspension link 400L (400R) interposed between bolt penetrating hole recess portion 403 and tip portion 400T of suspension link 400L constitutes breakable portion 411 which breaks (ruptures) in the case where the load input described above from the forward portion of the vehicle body occurs. This structure sets the cross sectional area in the load input direction (arrow-marked direction AF in FIG. 6B) of breakable portion 411 to be smaller than adjacent portions (AN1 and AN2 directions in FIG. 6B) of breakable portion 411. it should be noted that the same structure of other (right) suspension link 400R can be taken. As described hereinabove, breakable portion 411 is set so that the same effects can be obtained as those described in the first embodiment.

Third Embodiment

Figure 7A:
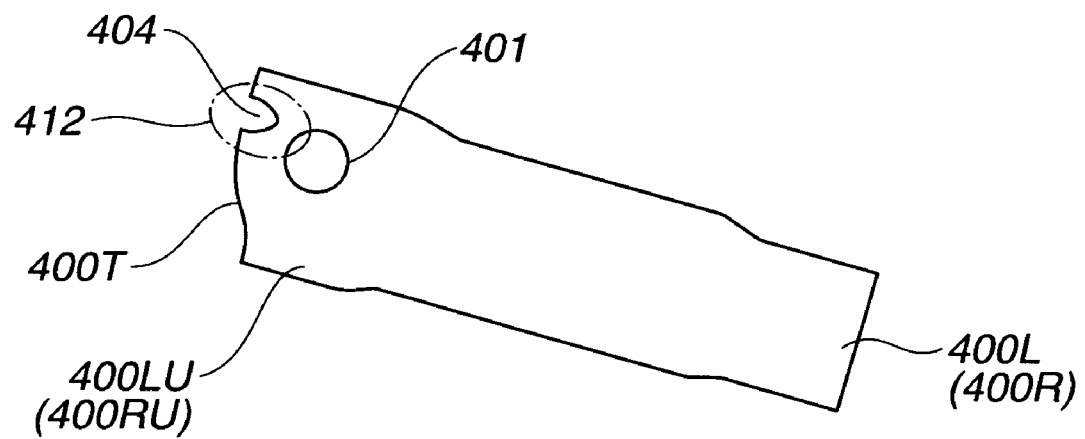
FIGS. 7A and 7B are same plan views of the left suspension link in the case of a third preferred embodiment according to the present invention.
Figure 7B:
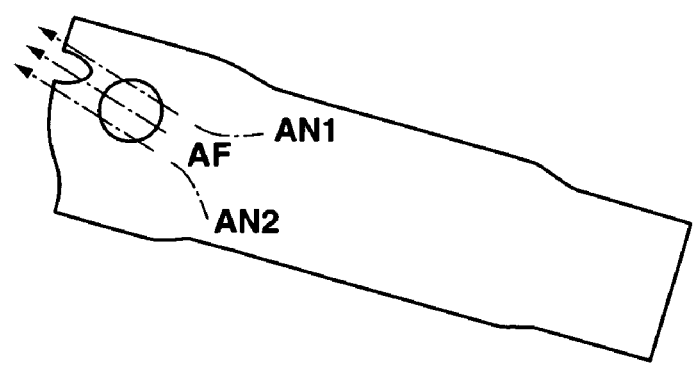

FIGS. 7A and 7B show same plan views of same suspension link 400L (400R) in a third embodiment according to the present invention. In this embodiment, only the form of breakable portion 412 is different from breakable portion 410 described in the first embodiment and the other suspension elements in the third embodiment are the same as those described in the first embodiment. Hence, only the form of breakable portion 412 will herein be described.

End recess portion 404 is provided on tip portion 400T of suspension link 400L (400R) near to bolt penetrating hole 401 of upper end portion 400LU (400RU) of suspension link 400L (400R). This end recess portion 404 is set to be aligned in the load input direction (arrow-marked AF direction in FIG. 7B) applied to suspension link 400L (400R) in a case where the load input described above is applied from the forward portion of the vehicle body. This bolt penetrating hole 401 and the portion interposed between bolt penetrating hole 401 and end recess portion 404 constitute breakable portion 412 which breaks in a case where the load input described above occurs. This structure causes the cross sectional area of breakable portion 412 in the load input direction (arrow-marked AF direction in FIG. 7B) to be set to be smaller than those of the adjacent portions (arrow-marked AN1 and AN2 portions in FIG. 7) to breakable portion 412. It should be noted that the same structure in the case of other (right) suspension link 400R can be taken in this embodiment. As described above, since breakable portion 412 is set, the same advantages as described in the first embodiment can be obtained.

According to the installation structure of the suspension in each of the first, second, and third embodiments according to the present invention, the following action and advantages (effects) can be obtained.

An installation structure of a vehicular suspension comprises first and second side members, each of the first and second side members being disposed on a corresponding side portion of a vehicle body along a forward-and-rearward direction of the vehicle body; a drive unit mounted on a space between the first and second side members; a drive shaft extended from the drive unit in a width direction of the vehicle body and connected to drive wheels; a suspension member formed on the space between the first and second side members and disposed at a lower-and-rearward portion of the drive unit; and first and second suspension links, each of the first and second suspension links linking a corresponding one of the first and second side members with the suspension member and being provided with a breakable portion which breaks due to a load generated when the load applied to a forward end portion of at least one of the first and second side members causes the drive unit and the drive shaft to be moved toward a rearward direction of the vehicle body to bring the drive shaft in contact against a corresponding one of the first and second suspension links. It should be noted that term of first corresponds to left and term of second corresponds to right.

According to the installation structure of the suspension described above, it can be assured that each suspension link with respect to the load input from the forward portion of the vehicle body is broken at the breakable portion thereof, together with the reduced deformation quantity of the vehicle body due to the retraction of the engine and the transmission, and deformation and rupture (break) of each suspension link due to the load input during the assembly operation thereof and during the actual traveling does not occur.

In addition, since the installation structure of the suspension in each of the first, second, and third embodiments according to the present invention, the breakable portion is provided on the upper portion of each suspension link. According to the installation structure described above, since the drive shaft is ordinarily placed at the lower portion of the vehicle and the breakable portion is placed at the upper portion of the drive shaft, the moment applied from the portion subjected to the load to the breakable portion becomes large so that the break (rupture) at each breakable portion can become easier to occur. A moment applied to each of breakable portions has a long moment arm and each suspension link is brought in contact with the drive shaft obliquely (as shown in FIG. 1) so that the break of breakable portion can more easily occur.

In addition, according to the installation structure of the suspension in each of the embodiments, the breakable portion is provided on the coupling portion of each suspension link between the suspension link and the side member. Since the breakable portion is provided on the coupling portion, the machining of the breakable portion becomes easy.

In the installation structure of the suspension according to the present invention, each suspension link is arranged to have a configuration in order for an elongate direction of each suspension link to be intersected to the lateral line (the horizontal line) extended in parallel to drive shaft 800 toward the corresponding one of the suspension links through a predetermined angle ($\theta$) as viewed from a top portion of the vehicle body as shown in FIG. 1. According to the installation structure of the suspension described above, since the contact position of each suspension link with the drive shaft is placed at more rearward portion than the linkage position between each suspension link and the corresponding one of the left and right front side members, the load applied to the linkage position provides the tensile load so that the break (rupture) at the breakable portion can more be assured. An installation structure of a vehicular suspension comprises: first and second side members, each of the first and second side members being disposed on a corresponding side portion of a vehicle body along a forward-and-rearward direction of the vehicle body; a drive unit mounted on a space between the first and second side members; a drive shaft extended from the drive unit in a width direction of the vehicle body and connected to drive wheels; a suspension member formed on the space between the first and second side members and disposed at a lower-and-rearward portion of the drive unit; and first and second suspension links, each of the first and second suspension links linking a corresponding one of the first and second side members with the suspension member and being provided with a breakable portion which breaks due to a load generated when the load equal to or higher than predetermined load input (F0) is applied to a forward end portion of at least one (or both) of the first and second side members.

It should be noted that the above-described embodiment are described in order to facilitate a better understanding of the present invention and do not limit the scope of the present invention. Hence, each essential element disclosed in the above-described embodiments includes all design modifications and equivalents belonging to the scope of the present invention. For example, the form of each breakable portion 410, 411, 412 is merely exemplified and the forms, magnitudes, positions, and number of bolt penetrating hole recess portion 403 and end recess portion 404 can arbitrarily be set. In addition, since the cross sectional area of breakable portion 410, 411, 412 in the load input direction may be set to be small as compared with those of adjacent portions, the forms of bolt penetrating hole 401 and tip portion 400T may be set for the cross sectional area of the breakable portion in the load input direction to be small as compared with those of the adjacent portions surrounding thereof.

This application is based on prior Japanese Patent Applications No. 2007-097229 and No. 2007-324186. The entire contents of Japanese Patent Applications No. 2007-097229 with a filing date of Apr. 3, 2007 and No. 2007-324186 with a filing date of Dec. 17, 2007 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An installation structure of a vehicular suspension, comprising:
    first and second side members, each of the first and second side members being disposed on a corresponding side portion of a vehicle body along a forward-and-rearward direction of the vehicle body;
    a drive unit mounted on a space between the first and second side members;
    a drive shaft extended from the drive unit in a width direction of the vehicle body and connected to drive wheels;
    a suspension member formed on the space between the first and second side members and disposed at a lower-and-rearward portion of the drive unit; and
    first and second suspension links, each of the first and second suspension links linking a corresponding one of the first and second side members with the suspension member and being provided with a breakable portion which breaks due to a load generated when a load applied to a forward end portion of at least one of the first and second side members causes the drive unit and the drive shaft to be moved toward a rearward direction of the vehicle body to bring the drive shaft in contact against a corresponding one of the first and second suspension links, a contacting position between each of the first and second suspension links and the drive shaft being positioned at a more rearward side than a linkage position of each of the first and second suspension links and the corresponding one of the first and second side members.

2. The installation structure of the vehicular suspension as claimed in claim 1, wherein the breakable portion is provided on an upper portion of each of the first and second suspension links.

3. The installation structure of the vehicular suspension as claimed in claim 1, wherein the breakable portion is provided on a coupling portion between each of the first and second suspension links and the corresponding one of the first and second side members.

4. The installation structure of the vehicular suspension as claimed in claim 1, wherein each of the first and second suspension links is arranged to have a configuration in order for an elongate direction of each of the first and second suspension links to be intersected to a horizontal line extended in parallel to the drive shaft toward the corresponding one of the first and second suspension links through a predetermined angle as viewed from a top portion of the vehicle body.

5. The installation structure of the vehicular suspension as claimed in claim 4, wherein the predetermined angle is set to fall in an angular range from 22 degrees to 62 degrees.

6. The installation structure of the vehicular suspension as claimed in claim 1, wherein the drive unit comprises an engine and a transmission, the vehicular suspension further comprises a front bumper reinforcement extended from each forward end portion of the first and second side members in the width direction of the vehicle body, the drive wheels are left and right front road wheels, and the first and second side members are left and right front side members, the engine and the transmission being disposed within an engine compartment enclosed with the front bumper reinforcement, the left and right front side members, and the suspension member.

7. The installation structure of the vehicular suspension as claimed in claim 6, wherein the breakable portion is constituted by a penetrating hole recess portion of each of the first and second suspension links continuous to a bolt penetrating hole provided on an upper end portion of each of the first and second suspension links through which the upper end portion thereof is tightened to a lower portion of each of the left and right front side members; an end recess portion provided on a tip portion of the upper end portion of each of the first and second suspension links; and a portion of the upper end portion of each of the first and second suspension links interposed between the penetrating hole recess portion and the end recess portion, a cross sectional area of the breakable portion in a direction of the load applied from the forward end portion of at least one of the left and right front side members being set to be smaller than that of each of adjacent portions to the breakable portion.

8. The installation structure of the vehicular suspension as claimed in claim 6, wherein the breakable portion is constituted by a penetrating hole recess portion of each of the first and second suspension links continuous to a bolt penetrating hole provided on an upper end portion of each of the first and second suspension links through which the upper end portion thereof is tightened to a lower portion of each of the front left and right side members; a tip portion of the upper end portion of each of the first and second suspension links; and a portion of the upper end portion of each of the first and second suspension links interposed between the penetrating hole recess portion and the tip portion, a cross sectional area of the breakable portion in a direction of the load applied from the forward end portion of at least one of the left and right front side members being set to be smaller than that of each of adjacent portions to the breakable portion.

9. The installation structure of the vehicular suspension as claimed in claim 6, wherein the breakable portion is constituted by a bolt penetrating hole provided on an upper end portion of each of the first and second suspension links through which the upper end portion thereof is tightened to a lower portion of each of the front left and right side members; an end recess portion provided on a tip portion of the upper end portion of each of the first and second suspension links; and a portion of the upper end portion of each of the first and second suspension links interposed between the bolt penetrating hole and the end recess portion, a cross sectional area of the breakable portion in a direction of the load applied from the forward end portion of at least one of the first and second left and right front side members being set to be smaller than that of each of adjacent portions to the breakable portion.

10. The installation structure of the vehicular suspension as claimed in claim 1, wherein a load applied to the linkage position is a tensile load, the breakable portion adapted to facilitate the breakable portion 11. An installation method of a vehicular suspension, comprising:
    disposing each of first and second side members on a corresponding side portion of a vehicle body along a forward-and-rearward direction of the vehicle body;
    mounting a drive unit on a space between the first and second side members;
    extending a drive shaft from the drive unit in a width direction of the vehicle body and connecting the drive shaft to drive wheels;
    forming a suspension member on the space between the first and second side members and disposing the suspension member at a lower-and-rearward portion of the drive unit; and
    linking via each of first and second suspension links a corresponding one of the first and second side members with the suspension member and providing a breakable portion on a corresponding one of the first and second suspension links, the breakable portion breaking due to a load generated when a load applied to a forward end portion of at least one of the first and second side members causes the drive unit and the drive shaft to be moved toward a rearward direction of the vehicle body to bring the drive shaft in contact against a corresponding one of the first and second suspension links, a contacting position between each of the first and second suspension links and the drive shaft being positioned at a more rearward side than a linkage position of each of the first and second suspension links and the corresponding one of the first and second side members.

12. The installation method of the vehicular suspension as claimed in claim 11, wherein a load applied to the linkage position is a tensile load, the tensile load adapted to facilitate the breakable portion breaking.

* * * * *